United States Patent [19]
Ohomori et al.

[11] Patent Number: 5,614,895
[45] Date of Patent: Mar. 25, 1997

[54] MAP INFORMATION REGENERATING DEVICE

[75] Inventors: Masahiro Ohomori; Masayuki Arai; Takeshi Imai, all of Saitama, Japan

[73] Assignee: Honda Giken Kogyo Kabushiki Kaisha, Tokyo, Japan

[21] Appl. No.: 337,156

[22] Filed: Nov. 9, 1994

[30] Foreign Application Priority Data

Nov. 19, 1993 [JP] Japan ................................. 5-338733

[51] Int. Cl.⁶ ................................................. G08G 1/123
[52] U.S. Cl. ......................... 340/995; 340/988; 340/990; 364/449.2; 395/135
[58] Field of Search ........................ 340/995, 990, 340/988, 993; 364/449, 460, 424; 395/135

[56] References Cited

U.S. PATENT DOCUMENTS

| 4,484,192 | 11/1984 | Seitz et al. | 340/995 |
| 4,514,810 | 4/1985 | Ito et al. | 364/424 |
| 4,796,190 | 1/1989 | Cummings | 364/449 |
| 4,845,631 | 7/1989 | Bottorf | 340/995 |
| 4,876,651 | 10/1989 | Dawson et al. | 340/995 |
| 5,270,937 | 12/1993 | Link et al. | 340/995 |
| 5,396,431 | 3/1995 | Shimizu et al. | 340/995 |
| 5,398,309 | 3/1995 | Atkins et al. | 395/135 |
| 5,442,557 | 8/1995 | Kaneko | 340/995 |

FOREIGN PATENT DOCUMENTS

| 62-133600 | 6/1987 | Japan . |
| 450718 | 2/1992 | Japan . |

*Primary Examiner*—Jeffery Hofsass
*Assistant Examiner*—Benjamin C. Lee
*Attorney, Agent, or Firm*—Lyon & Lyon

[57] ABSTRACT

A map information regenerating device usable in a vehicle travel guiding apparatus, which device is capable of freely revising a road map, i.e., adding, changing and deleting a road on the road map without changing data stored in a basic map-information storage but correlating change data with existing roads to assure the possibility of performing map-data processing such as course searching according to the revised map data. The device is so constructed that the map information may be read-out from a map information storage and stored in a buffer memory wherein the data is revised in a specified procedure according to the map change data read-out from an additionally used storage medium or/and obtained by using transmitting/receiving means.

5 Claims, 2 Drawing Sheets

MAP INFORMATION REGENERATING DEVICE

BACKGROUND OF THE INVENTION

The present invention relates to a map information regenerating device which is capable of regenerating map information stored in a map-information storage medium, such as for a vehicle travel guiding apparatus.

The Japanese laid open patent publication No. 4-50718 discloses such a vehicle travel guiding apparatus which is capable of displaying a current location of a vehicle on a road map shown on a display screen on the basis of area-map data read from a map-information storage medium by successively determining two-dimensional coordinates of the vehicle by cumulative calculation of detected distances and a direction of its travelling. This apparatus is characterized in that a current location of the vehicle, which is indicated as off a road on the road map as a result of an accumulated error, can be corrected in such a procedure that a pattern of the vehicle's travel trace to the present location and a pattern of a selected road extracted from the map data are compared with each other for a match and then the vehicle's position is aligned with the matched road.

The Japanese laid open patent publication No. 62-133600 discloses another travel guiding apparatus for a vehicle, which is capable of setting a start point and a target point on a road map shown on a display screen and searching digital map data to find an optimal (e.g., the shortest) course therebetween for the purpose of guiding the vehicle.

Map information to be used in the above-mentioned guiding apparatuses is generally stored as digitized data in a read only storage medium, e.g., CD-ROM. When the map is partially changed, for example, with the addition of a new road, the storage medium in use must be replaced with a new revised one. To cope with any change made in the road map, it has been proposed to use an additional read only memory (e.g., an IC card) for storing only revised map data, e.g., data relating to a new road or roads, in such a way that any changed information (e.g., a new road) may be read-out from the additional ROM and its image may be overlapped on a road map indicated on the screen, which corresponds to the basic (not revised) data read from the data base stored in the road map-information storage.

The drawbacks involved in the prior art devices are as follows:

First, every time a road map is even partially changed, which may frequently occur, it is required to replace a full storage medium with a new one. It is wasteful to use the storage medium in that way.

In the case when an additional ROM for storing changed data of the road map is used to read therefrom the necessary changed data of the road map and to display the changed portion image by overlapping it on a basic road map displayed on a screen, which is based upon the road map data read-out from the map information (data base) storage medium, it is only possible to add a new road but impossible to change and/or delete any road shown on the screen.

Particularly, overlaying an image of a newly laid-out road on the basic road map indicated on the screen may only synthesize two images without correlation between the changed data from a data correcting ROM and the basic road map data and, therefore, it cannot indicate whether a newly added road meets and crosses with an existing road or merely crosses over the latter without interconnection. In this case, it is also impossible to perform map-data processing such as pattern matching, optimal course searching and so on according to the revised map data.

SUMMARY OF THE INVENTION

Accordingly, the present invention has as its principal object the provision of a map information regenerating device which is capable of freely revising a road map, i.e., adding, changing and deleting a road or roads on the road map, keeping unchanged the data stored in a basic map-information storage and, at the same time, correlating the change data with existing roads to provide the possibility of further processing such as course searching according to the changed map-data. The device is, therefore, constructed so that a map information may be read-out from a map information storage and stored in a buffer memory wherein the data is revised according to a specified procedure by applying the map change data read-out from an additional storage of map change data.

Another object of the present invention is to provide a map information regenerating device which is capable of receiving map change data transmitted from a fixed station and carrying-out map-data processing for revising a map information read-out from a map information storage and stored in a buffer memory according to a specified procedure by applying the received map-change data.

DESCRIPTION OF THE PREFERRED EMBODIMENTS

Figure 1:
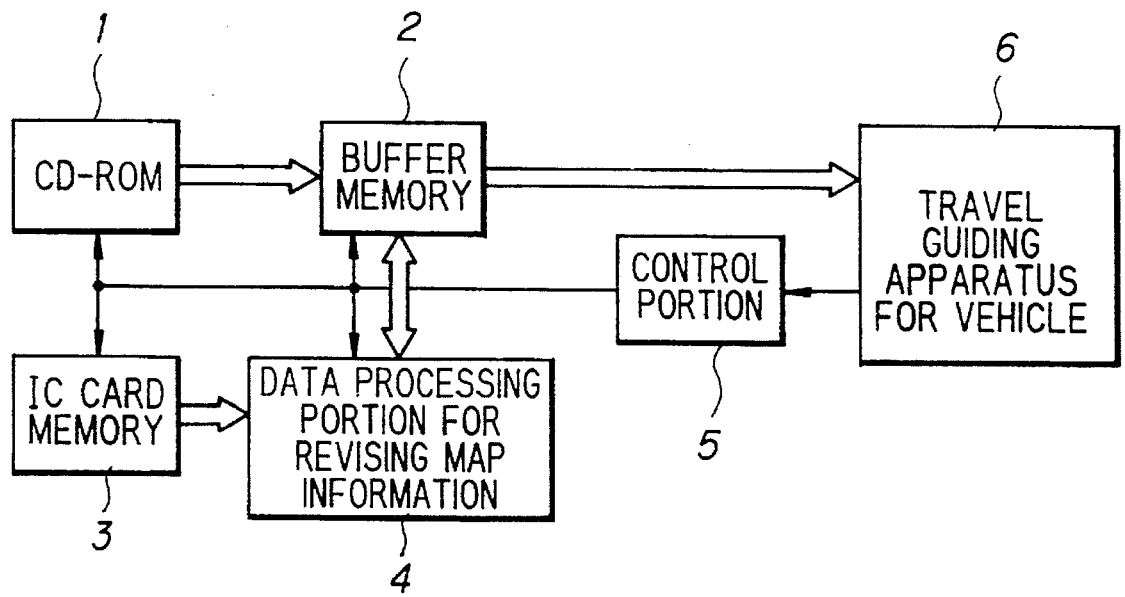
FIG. 1 is a block construction diagram showing an example of a map information regenerating device embodying the present invention.

Referring now to the drawings, preferred embodiments of the present invention will be described in detail as follows:

As shown in FIG. 1, a map information regenerating device according to the present invention comprises: a compact-disk type read-only memory (CD-ROM) 1 as a map-data storage medium, wherein road map data digitized to express positions of link nodes and node-link connections for line segments (links) obtained by linear approximation of road components have been stored in advance; a buffer memory 2 for storing therein map data of a specified area, which data is selectively read-out from the CD-ROM 1; an IC-card memory 3 as a read-only storage medium for storing changed map information; a map data processing unit 4 for revising the map data stored in the buffer memory 2 by using the map change data read-out from the IC-card memory 3 in a specified procedure by using a specified processing program; and a control unit 5 controlling each portion of the device according to a specified control program.

In FIG. 1, numeral 6 designates a travel guiding apparatus for a vehicle, which is generally applied for vehicle navigation and necessarily uses map information. The apparatus 6 may be of the type that determines a current position of the vehicle on a specified area's road-map indicated on a display screen according to the map information read-out from the buffer memory 2 by detecting a vehicle's travel distance and a running direction and successively determining the current position of the vehicle in a two-dimensional coordinate system by cumulative calculation or by electronic navigation using a GPS system.

The vehicle travel guiding apparatus 6 is capable of correcting the indicated current position of the vehicle, which may be indicated as off the road on the map as the result of cumulative calculation error in determining X- and Y-coordinates of the vehicle on the basis of its detected travel distance and running direction in such a way that a pattern of the vehicle travel trace obtained by retaining records of current position data is matched with the corresponding road pattern extracted according to the map information and then the trace is aligned to the identified road on the map indicated on the display screen.

The vehicle travel guiding apparatus 6 is also capable of searching an optimal (e.g., the shortest) course between a start point and a target point preset on the road map indicated on the display screen according to the map information and then the apparatus guides the vehicle to follow the selected course.

The operation of the map information regenerating device shown in FIG. 1 will be described as follows:

When the vehicle travel guiding apparatus 6 receives an input requesting map information of a specified area, it gives an access instruction for obtaining the necessary map information to the control portion 5 which in turn reads the map data of the specified area from the CD-ROM 1 and stores the data in the buffer memory 2.

The control portion 5 examines whether any change information for the specified map area is stored in the IC-card memory 3 or not, and, when the change information exists, reads said information therefrom and gives it to the map-data processing portion 4 for revising the map information, simultaneously driving a processing program to run.

The data processing portion 4 reads the map data in the buffer memory 2, performs processing for revising the map data in a specified procedure according to the map change information and then returns the revised map information to the buffer memory 2.

The control portion 5 informs the vehicle travel guiding apparatus that the required map data has been already prepared in the buffer memory 2, and then transfers the data from the buffer memory 2 to the vehicle travel guiding apparatus.

In the case when the IC card memory 3 does not contain any change information for the specified map area selectively read-out from the CD-ROM 1, the control portion 5 does not drive the map-data processing portion 4 and only transfers the map information from the buffer memory 2 to the vehicle travel guiding apparatus 6, thereby providing the latter with information about the required map data that has been prepared in the buffer memory 2.

Figure 2:
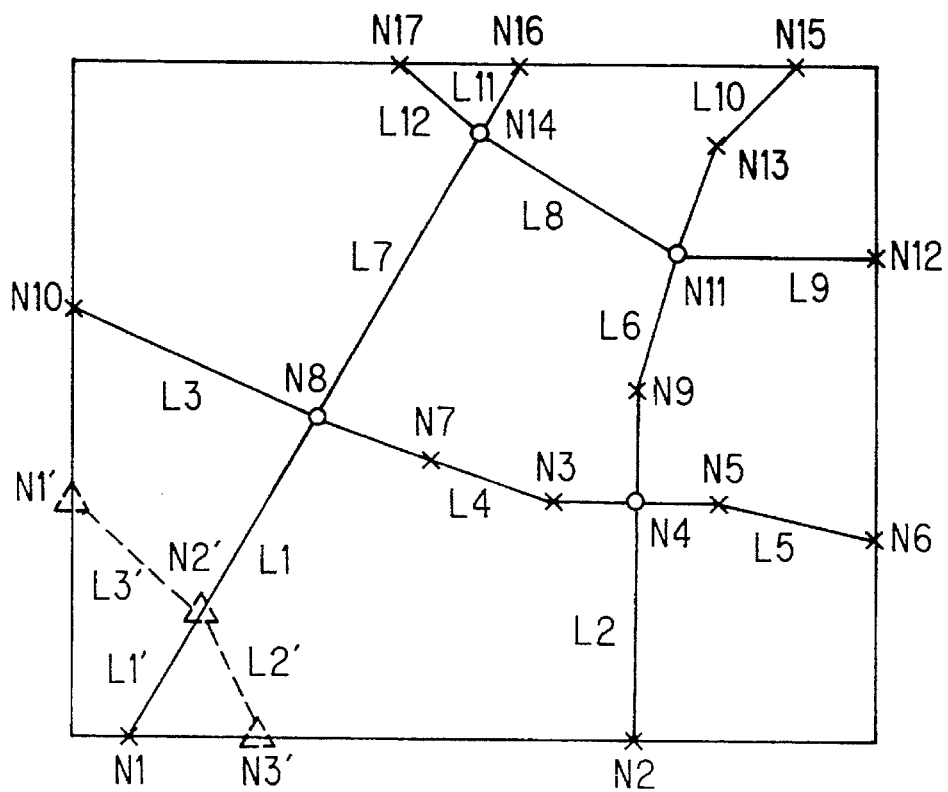
FIG. 2 shows an example of digitized map information.

FIG. 2 shows an example of map information which is composed of digitized data on nodal positions of links representing line segments approximating components of a road and connections of links with nodes. The digital map information consists of a node table containing position data (X- and Y-coordinates) of nodes (N1, N2, N3 . . .) at both ends of each link (L1, L2, L3 . . .), a link table containing serial numbers of both nodes of each link, and an intersection (cross point) table containing serial numbers of nodes at each intersection (C1, C2, C3 . . .) and serial numbers of links connected to each intersection.

Table 1 shows contents of the node table, link table and intersection (cross point) table for map information shown in FIG. 2.

TABLE 1

| Node Table | Link Table | Intersection Table |
| --- | --- | --- |
| N1 x1, y1 | L1 N1 - N8 | C1 N4 L2-L4-L5-L6 |
| N2 x2, y2 | L2 N2 - N4 | C2 N8 L1-L3-L4-L7 |
| N3 x3, y3 | L3 N8 - N10 | C3 N11 L6-L8-L9-L10 |
| N4 x4, y4 | L4 N4-N3-N7-N8 | C4 N14 L7-L8-L11-L12 |
| . | . | |
| . | . | |
| N17 x17, y17 | L12 N14 - N17 | |

Referring to FIG. 2, it will be described below how a new road shown by a dotted line is added to the area's map information read-out from the CD-ROM 1.

In this case, the IC card memory 3 contains the following change map data written therein:

(1) ADD [N17+1], 3, N1' (x1', y1'), N2' (x2', y2'), N3' (x3', y3')
(2) MOD [L1], N2'–N8
(3) ADD [L12+1], 3, L1' N1'–N2', L2' N2'–N3', L3' N1'–N2'
(4) ADD [C4+1], 1, C1' N2' L1—L1' –L2' –L3'

The data (1) means that three new nodes N1', N2' and N3' must be added after the node N17 in the node table, and the data (2) means that two nodes at both ends of the link 1 in the link table are to be changed by nodes N2' and N8 respectively. The data (3) means that three new links L1', L2' and L3' must be added after the link L1 in the link table, and the data (4) means that a new intersection C1' must be added after the intersection C4 in the intersection table.

The map data processing portion 4 reads the map changing data written in the IC card memory 3 and revises the contents of the tables stored in the buffer memory 2 (for map information indicated in FIG. 2) according to the procedure (1)–(4).

Table 2 is a table of the changed map data.

TABLE 2

| Node Table | Link Table | Intersection Table |
| --- | --- | --- |
| N1 x1, y1 | L1 N2' - N8 | C1 N4 L2-L4-L5-L6 |
| N2 x2, y2 | L2 N2 - N4 | C2 N8 L1-L3-L4-L7 |
| N3 x3, y3 | L3 N8 - N10 | C3 N11 L6-L8-L9-L10 |
| N4 x4, y4 | L4 N4-N3-N7-N8 | C4 N14 L7-L8-L11-L12 |
| . | . | C1' N2' L1-L1'-L2'-L3' |
| . | . | |
| N17 x17, y17 | L12 N14 - N17 | |
| N1' x1', y1' | L1' N1 - N2' | |
| N2' x2', y2' | L2' N2' - N3' | |
| N3' x3', y3' | L3' N1 - N2' | |

Although the above-mentioned data is map change data to be added and modified by executing instructions ADD and MOD, there may be still other kinds of data to be deleted and :moved according to basic procedures for executing instructions DEL [X] and MOV [X1], n, [X2].

According to the present invention, it is possible to easily make any complicated revision of the map information stored in CD-ROM1 by applying a combination of map data revising procedures, i.e., by adding, modifying, deleting and moving data relating to nodes, links and intersections, which are stored as map change information in the IC card memory 3.

The present invention makes it possible to revise the map information by rewriting the content of the data tables for digital map information instead of the conventional map image synthesizing method. Therefore, the device according to the present invention can judge whether a newly added road meets and intersects with a road on the basic map indicated on the display screen on the basis of the data and it enables the vehicle travel guiding apparatus 6 to carry out the above-mentioned kinds of map-data processing, i.e., correction of a current position of the vehicle by pattern matching method, searching of an optimal travel course for the vehicle and so on. In this embodiment, an IC card memory 3 of the read-only memory type is used for supplying map change information but it may be an erasable programmable read-only memory (EP-ROM) which records can be rewritten to the latest map change information by using a terminal at a supplier of map information.

Figure 3:
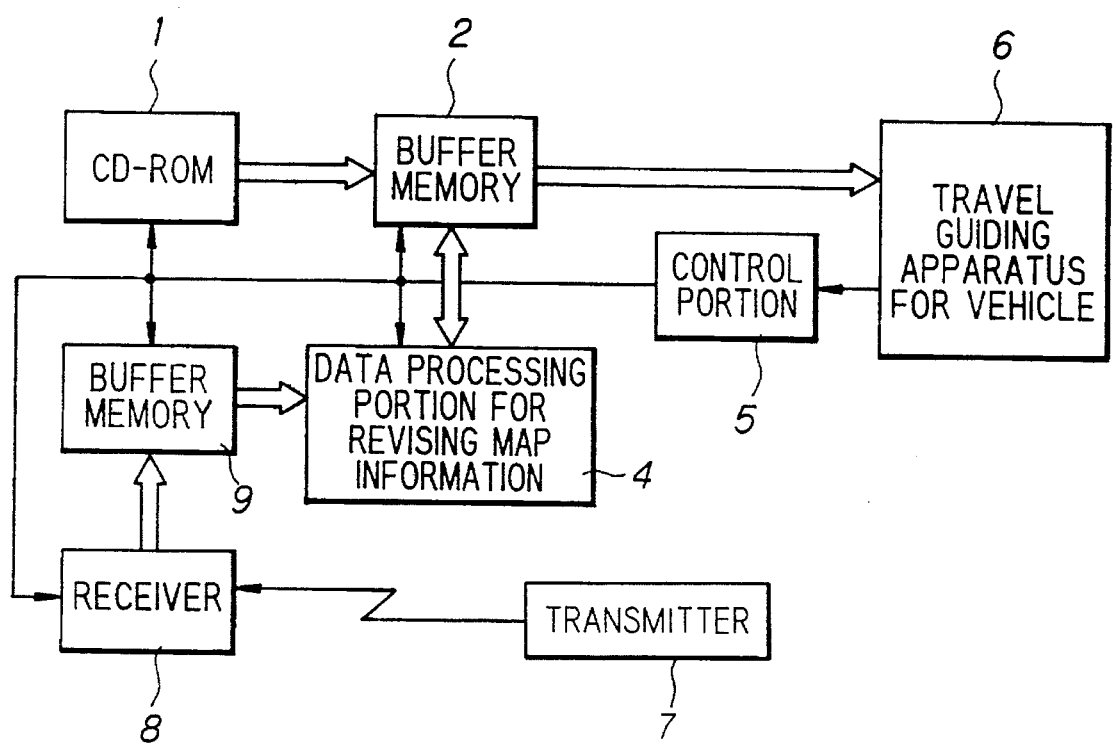
FIG. 3 is a block construction diagram showing another example of a map information regenerating device embodying the present invention.

Referring to FIG. 3, there is another embodiment of the present invention illustrated which is a map information regenerating device not provided with any storage medium for map change information such as IC card memory 3, and having a receiver 8 for receiving radio waves (or light signals) of map change information from a broadcasting station or a transmitting device 7 installed along a road. The map change information received by the radio receiver under the control of a control portion 5 is stored in a buffer memory 9 and is used for revising the map information read-out from a storage CD-ROM 1 in the same way as described above.

A thus constructed device can always get the latest map change information, being therefore free from the necessity of acquiring an IC card memory containing map change information at each time the map is revised.

In this device, it is also possible to add real-time traffic information (e.g., an average running speed and time required for passing a block between nodes N8 and N2' shown in FIG. 2) to the map information transmitted from the transmitter 7 so that a suitable travel course may be selected on the map indicated on a display screen of the vehicle guiding apparatus according to the real-time traffic service information.

As is apparent from the foregoing, the map information regenerating device according to the present invention, which is provided with an additional storage medium usable for revising map information, is capable of freely rewriting the content of a data table, which content is read-out from a data-base storage for map information and stored in a buffer memory, according to a specified procedure for revising the map data by using the map change information read-out from the additional storage medium without changing the data base. The device is also capable of judging whether a newly added road meet and intersects with any existing road on the main map or not on the basis of the revised map data.

The map information regenerating device according to a modification of the present invention is provided with transmitting-receiving means for receiving map change information transmitted from a fixed station instead of an additional storage for map change information. Accordingly, the device is capable of always obtaining the latest map change information from the station, thereby eliminating the necessity of replacing the additional storage of map change information with a new one every time the map is revised.

What is claimed is:

1. A map information regenerating device comprising:

a map-information storage means for storing as road map information therein node information and link information on line segments with which roads extending on a map are approximated;

a map-change information storage means for storing as road change information therein node information and link information on a road to be changed on said map, in correlation with said node information and said link information on line segments stored in said map-information storage means;

a buffer memory for storing therein road map information on a specified area, said road map information being read-out from said map-information storage means;

a map-information revising means for revising said road map information on said specified area stored in said buffer memory, in accordance with said road change information read-out from said map-change information storage means; and a display means for displaying on a screen a road map of said specified area in accordance with said road map information which has thus been revised.

2. A map information regenerating device according to claim 1, characterized in that said map-change information storage medium includes a separate buffer memory and means for supplying map-change information to said separate buffer memory.

3. A map information regenerating device according to claim 1, characterized in that said map-change information storage medium comprises an erasable programmable read-only memory means.

4. A map information regenerating device comprising:

a map-information storage means for storing as road map information therein node information and link information on line segments with which roads extending on a map are approximated;

a transmitting means for transmitting, in the form of road change information, node information and link information on a road to be changed on said map, in correlation with said node information and said link information on line segments stored in said map-information storage means;

a receiving means for receiving said road change information transmitted from said transmitting means;

a buffer memory for storing therein road map information on a specified area, said road map information being read-out from said map-information storage means;

a map-information revising means for revising said road map information on said specified area stored in said buffer memory, in accordance with said road change information received; and a display means for displaying on a screen a road map of said specified area in accordance with said road map information which has thus been revised.

5. A map information regenerating device according to claim 4, characterized in that said remote transmitting means is located at a fixed station, said map change information is transmitted from the fixed station and is received in the vehicle wherein said application apparatus using the present device is mounted.

* * * * *